(12) United States Patent
Kitajima et al.

(10) Patent No.: US 12,025,085 B2
(45) Date of Patent: Jul. 2, 2024

(54) TANK DEVICE (71) Applicant: YAMASHIN-FILTER CORP., Kanagawa (JP)

(72) Inventors: Nobuyuki Kitajima, Kanagawa (JP); Mitsunobu Okamoto, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 392 days.

(21) Appl. No.: 17/551,258

(22) Filed: Dec. 15, 2021

(65) Prior Publication Data

US 2022/0106933 A1 Apr. 7, 2022

Related U.S. Application Data (63) Continuation of application No. PCT/JP2020/025235, filed on Jun. 26, 2020.

(30) Foreign Application Priority Data

Jul. 3, 2019 (JP) .................................. 2019-124744

(51) Int. Cl.
*F02M 37/42* (2019.01)
*B01D 29/11* (2006.01)
*B01D 35/027* (2006.01)

(52) U.S. Cl.
CPC ............ *F02M 37/42* (2019.01); *B01D 29/11* (2013.01); *B01D 35/027* (2013.01)

(58) Field of Classification Search
CPC ...... F02M 37/42; B01D 29/11; B01D 35/027; B01D 2201/306; B01D 29/15; B01D 36/001; B01D 2201/16; B01D 29/21; B01D 29/606; B01D 35/0273; B01D 29/58; B01D 29/96; B01D 35/153; B01D 35/00
See application file for complete search history.

(56) References Cited

U.S. PATENT DOCUMENTS

| | | | |
|---|---|---|---|
| 2004/0164008 | A1 | 8/2004 | Smith |
| 2004/0164009 | A1 | 8/2004 | Smith |
| 2014/0231366 | A1 | 8/2014 | Ries et al. |
| 2019/0321758 | A1 | 10/2019 | Kitajima et al. |

FOREIGN PATENT DOCUMENTS

| | | |
|---|---|---|
| EP | 1449572 A2 | 8/2004 |
| JP | S53-162917 U | 12/1978 |
| JP | H6-10654 U | 2/1994 |

(Continued)

OTHER PUBLICATIONS

International Search Report issued in PCT/JP2020/025235 dated Sep. 8, 2020 with English Translation (6 pages).

(Continued)

*Primary Examiner* — Waqaas Ali
(74) *Attorney, Agent, or Firm* — Nakanishi IP Associates, LLC (57) ABSTRACT

A tank has two substantially parallel side surfaces, a tank first side surface and a tank second side surface, and the return filter is provided in the tank via an insertion hole formed in the tank first side surface. The strainer has one end provided on an outflow portion provided on a bottom surface of a filter case and the other end provided on the tank second side surface.

4 Claims, 7 Drawing Sheets

(56) References Cited

FOREIGN PATENT DOCUMENTS

| | | | |
|---|---|---|---|
| JP | H6-22577 U | | 3/1994 |
| JP | 2000-117015 A | | 4/2000 |
| JP | 2008-290004 A | | 12/2008 |
| JP | 2017-196552 A | | 11/2017 |
| JP | 2017196552 A | * | 11/2017 |
| WO | 2018/147223 A1 | | 8/2018 |

OTHER PUBLICATIONS

Extended European Search Report issued in European Patent Application No. 20835664.2, dated Jun. 15, 2022 (8 pages).
Office Action issued in European Patent Application No. 20835664.2, dated May 24, 2023 (6 pages).

* cited by examiner

TANK DEVICE

CROSS-REFERENCE TO RELATED APPLICATIONS

This application is a continuation application of International Patent Application No. PCT/JP2020/025235 filed on Jun. 26, 2020, which claims priority to Japanese Patent Application No. 2019-124744 filed on Jul. 3, 2019, the entire contents of which are incorporated by reference.

TECHNICAL FIELD

The present invention relates to a tank device.

BACKGROUND ART

Patent Document 1 discloses a tank device in which insertion of a cartridge including a filtration member into a filter case, a first hole and a second hole formed in the cartridge are joined to a third hole and a fourth hole formed in the filter case, respectively, a first cover member to a fourth cover member do not cover the first hole to the fourth hole, respectively, and an internal space of the cartridge communicates with an internal space of the filter case.

CITATION LIST

Patent Literature

Patent Document 1: JP 2017-196552 A

In the invention described in Patent Document 1, at the time of replacing the cartridge, taking the cartridge in and out from an opening in an upper side of a tank are necessary. At this time, a worker needs to climb to a high spot and perform the replacement work. This possibly causes problems in, for example, safety of the worker and workability of the replacement work.

SUMMARY OF INVENTION

One or more embodiments of the present invention is to provide a tank device in which a filter element can be replaced from a side surface of a tank.

A tank device according to one or more embodiments of the present invention includes, for example, a tank, a return filter, a lid body, and a strainer. An inside of the tank is a cavity. The return filter is provided sideways inside the tank. The return filter includes a filter case, a head, and a filter element. The filter case has one end as an opening and has a bottomed substantially tubular shape. The head is provided inside the filter case. The filter element includes a filtration member having a substantially tubular shape, a valve receiving member provided on an end face of the filtration member, and a valve provided in the valve receiving member. The lid body is provided on the return filter to cover the opening. The strainer is disposed sideways inside the tank and disposed on the return filter. The tank has two substantially parallel side surfaces of a tank first side surface and a tank second side surface. An insertion hole is formed in the tank first side surface. The filter case is provided on the tank first side surface and inserted into the tank from the insertion hole. The filter case has a bottom surface provided with an outflow portion that causes a liquid that has passed through the filtration member to flow out to the tank. The strainer has one end provided on the outflow portion and the other end provided on the tank second side surface. The valve receiving member includes a plate-like (plate-shaped) portion having a substantially plate shape. The plate-like (plate-shaped) portion has a first hole and a second hole having substantially tubular shapes. The first hole causes oil to flow into the filtration member. The second hole causes oil after filtration as oil filtered by the filtration member to flow out. The valve includes a first valve and a second valve. The first valve includes a first cover member and a first compression spring. The first cover member includes a first inserted portion inserted into the first hole to close the first hole. The first compression spring disposes the first cover member at a position where the first inserted portion closes the first hole. The second valve includes a second cover member and a second compression spring. The second cover member includes a second inserted portion inserted into the second hole to close the second hole. The second compression spring disposes the second cover member at a position where the second inserted portion closes the second hole. The head includes a plate, a third cover member, a fourth cover member, and a third compression spring. The plate has a third hole and a fourth hole. The third cover member includes a third inserted portion insertable into the third hole. The fourth cover member includes a fourth inserted portion insertable into the fourth hole. The third compression spring biases a force in a direction toward the opening on the plate so that the plate is disposed at a position where the third cover member closes the third hole and the fourth cover member closes the fourth hole. The filter device is configured such that, when the filter element is inserted into the filter case from the opening (e.g., responding to the insertion of the filter element into the filter case from the opening), a first surface of the first cover member abuts on a third surface of the third cover member, a second surface of the second cover member abuts on a fourth surface of the fourth cover member, and the plate abuts on the valve receiving member (a first state). The filter device is configured such that, when the filter element is pushed into the filter case (e.g., responding to the push of the filter element into the filter case), the valve receiving member presses the plate against a biasing force of the third compression spring, the third cover member presses the first cover member against a biasing force of the first compression spring, and the fourth cover member presses the second cover member against a biasing force of the second compression spring (a second state). The filter device is configured such that, when the filter element is inserted into the filter case up to a deepest part of the filter case, the first hole communicates with the third hole (e.g., responding to the insertion of the filter element into the filter case up to a deepest part of the filter case makes the first hole communicate with the third hole), the second hole communicates with the fourth hole, and an internal space of the filter element communicates with an internal space of the head (a third state).

According to the tank device according to one or more embodiments of the present invention, the return filter and the strainer are provided sideways inside the tank that is the cavity. The tank has the two substantially parallel side surfaces, the tank first side surface and the tank second side surface, and the return filter is provided in the tank via the insertion hole formed in the tank first side surface. The strainer has the one end provided on the outflow portion provided on the bottom surface of the filter case and the other end provided on the tank second side surface. In this way, integrating and providing the return filter and the strainer sideways inside the tank allows replacing the filter element from the side surface of the tank.

The return filter and the strainer are sandwiched between the two parallel side surfaces of the tank. Accordingly, even when the return filter and the strainer are disposed sideways, the return filter and the strainer can be securely fixed to the inside of the tank.

Furthermore, when the filter element is inserted into the filter case from the opening, the first surface of the first cover member and the second surface of the second cover member on the filter element side abut on the third surface of the third cover member and the fourth surface of the fourth cover member on the head side, respectively, and the plate abuts on the valve receiving member. By pushing the filter element into the filter case, the valve receiving member presses the plate against the biasing force of the third compression spring and the third cover member presses the first cover member against the biasing force of the first compression spring to open the first hole and the third hole, and the fourth cover member presses the second cover member against the biasing force of the second compression spring to open the second hole and the fourth hole. Furthermore, when the filter element is pushed into the filter case, the first hole communicates with the third hole, the second hole communicates with the fourth hole, and the internal space of the filter element communicates with the internal space of the head. That is, the internal space of the filter element communicates with the internal space of the head for the first time when the filter element is mounted on the head. Thus, even when the return filter is installed sideways, a leakage of liquid inside the tank or liquid inside the filter element can be avoided at the time of replacing the filter element.

Here, the return filter may include a tubular member that communicates between an outside of the tank and an inside of the filter case. The tank may have a tank third side surface as a side surface adjacent to the tank first side surface and the tank second side surface. Each of the tank third side surface and the filter case may have a hole into which the tubular member is inserted. This prevents the return filter and the strainer from vibrating in conjunction with a vibration of the tank device, and strength of the tank device can be further increased.

Here, the return filter and the strainer may be provided near a bottom surface of the tank. As a result, an installation position of the return filter can be lowered, and safety of a replacement work can be increased.

According to one or more embodiments of the present invention, the filter element can be replaced from the side surface of the tank.

DESCRIPTION OF EMBODIMENTS

Hereinafter, embodiments of the present invention will be described in detail with reference to the drawings. A tank device of the present invention is provided in a construction machine, such as a hydraulic shovel.

The construction machine mainly includes, for example, a lower traveling body including a crawler belt, an upper turning body provided on the upper side of the lower traveling body, a boom, an arm mounted to the distal end of the boom, a work portion including, for example, a bucket mounted on the distal end of the arm, a hydraulic circuit including, for example, a hydraulic cylinder and a tank that drives the work portion, and an operating room. For example, the work portion, the hydraulic circuit, and the operating room are provided in the upper turning body. The tank device of the present invention is a part of the hydraulic circuit.

Hereinafter, the description will be given that the tank device of the present invention filters hydraulic oil used in the hydraulic circuit, but liquid to be filtered is not limited to the hydraulic oil. The tank device can filter various liquids, such as oil and water.

Figure 1:
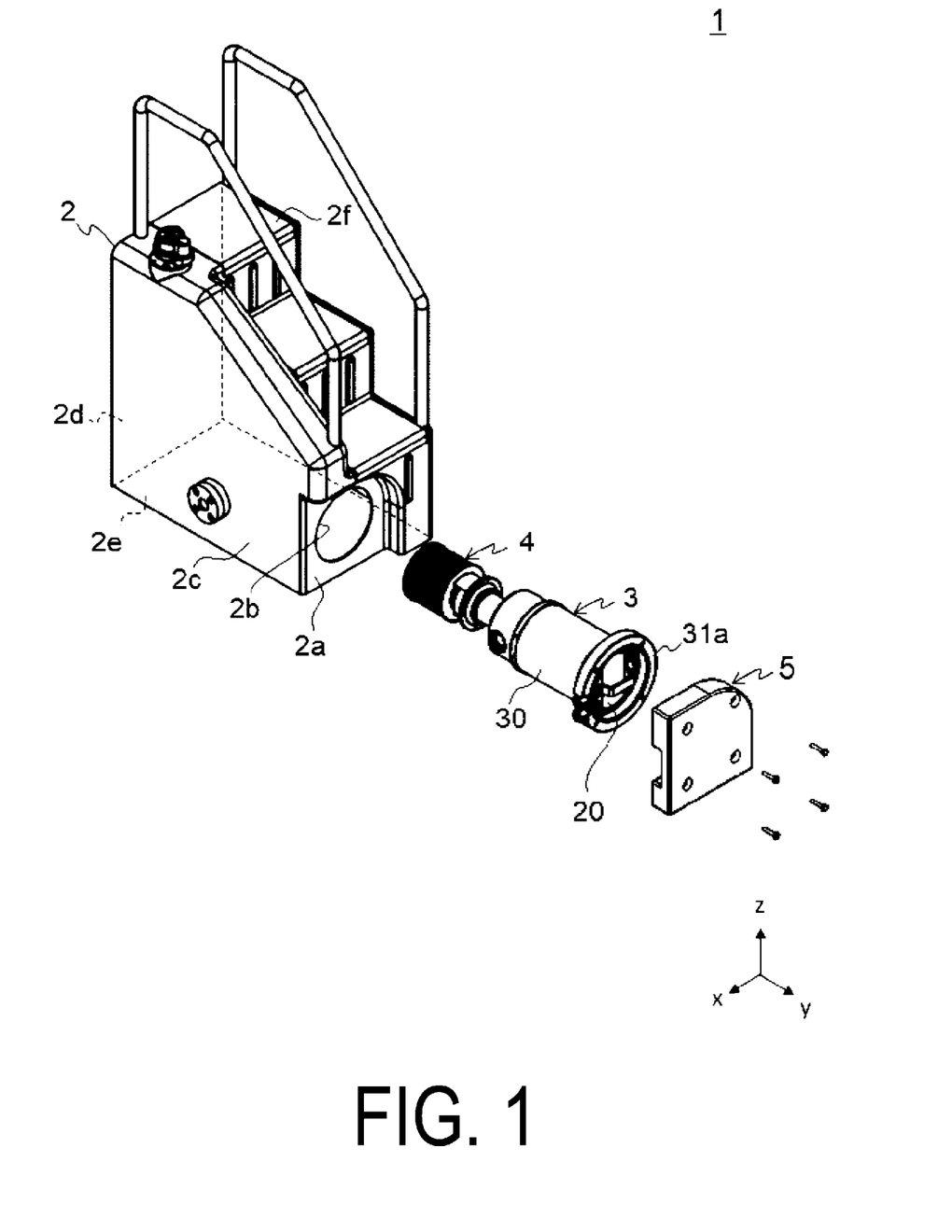
FIG. 1 is an exploded perspective view illustrating an outline of a tank device 1 according to an embodiment of the present invention.
Figure 2:
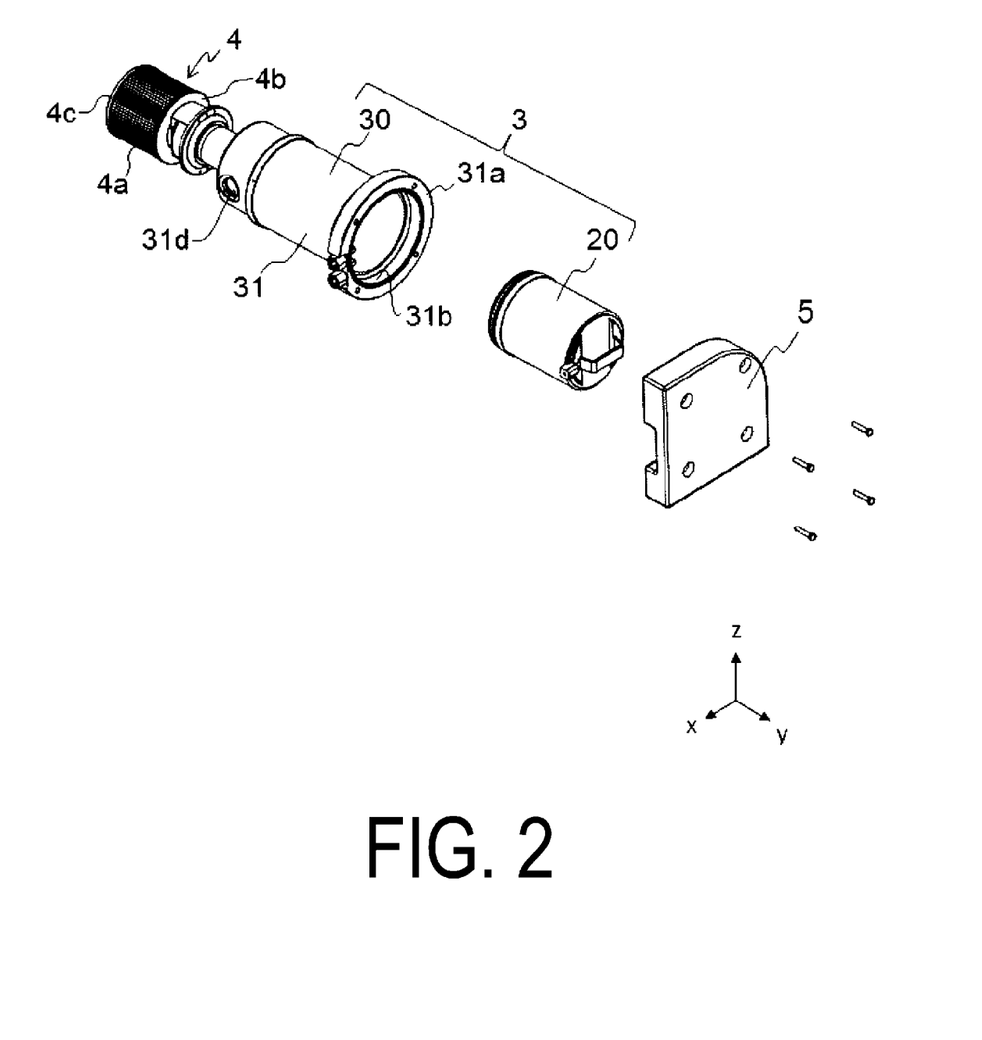
FIG. 2 is an exploded perspective view illustrating an outline of a return filter 3 and a strainer 4 as a part of the tank device 1.

FIG. 1 is an exploded perspective view illustrating an outline of a tank device 1 according to an embodiment of the present invention. FIG. 2 is an exploded perspective view illustrating an outline of a return filter 3, a strainer 4, and a lid body 5 as a part of the tank device 1.

The tank device 1 mainly includes a tank 2, the return filter 3, the strainer 4, and the lid body 5.

An inside of the tank 2 is a cavity where the hydraulic oil is stored. The tank 2 mainly has side surfaces 2*a*, 2*c*, and 2*d*, a bottom surface 2*e*, and a top surface 2*f* formed in a staircase pattern. However, the shape of the tank 2 is not limited to this.

An insertion hole 2*b* is provided in the side surface 2*a*. The insertion hole 2*b* is formed near the bottom surface 2*e*.

The return filter 3 and the strainer 4 are provided inside the tank 2. The return filter 3 and the strainer 4 are integrated and provided inside the tank 2 via the insertion hole 2*b* formed in the side surface 2*a* of the tank 2.

Since the insertion hole 2*b* is formed near the bottom surface 2*e*, the return filter 3 and the strainer 4 are provided sideways near the bottom surface 2*e*. Note that in the present invention, "sideways" includes a state in which the center axis runs along the horizontal direction and a state in which the center axis is inclined slightly (for example, around 10 degrees) with respect to the horizontal direction.

The strainer 4 and a housing 30 are inserted into the tank 2 from the insertion hole 2*b*, a flange portion 31*a* (described in detail later) abuts on the side surface 2*a* to be fixed, and thus the return filter 3 and the strainer 4 are provided inside the tank 2.

The return filter 3 mainly includes a filter element 20 and the housing 30. The housing 30 has one end face that is open as an opening 31*b*. After use for a predetermined period of time, the filter element 20 that has been already used is removed from the housing 30 via the opening 31*b*. The new filter element 20 is provided inside the housing 30 via the opening 31*b*. The flange portion 31*a* for attaching the housing 30 to the side surface 2*a* is provided around the opening 31*b*. The return filter 3 will be described in detail later.

The strainer 4 is provided inside the tank 2 to prevent an entry of a foreign material into a hydraulic pump. The hydraulic oil stored inside the tank 2 is sucked into the hydraulic pump (not illustrated) via the strainer 4 and supplied to a hydraulic device again. The strainer 4 mainly includes a filtration member 4a, an upper end support member 4b, and a lower end support member 4c. The filtration member 4a is, for example, a metal plate-like member formed with a large number of holes, and is formed into a substantially cylindrical shape by connecting both ends of the filtration member to round the filtration member into a cylindrical shape. Note that the configuration of the filtration member 4a is not limited thereto. The upper end support member 4b is a plate-like member covering the upper end of the filtration member 4a, and the lower end support member 4c is a plate-like member covering the lower end of the filtration member 4a.

The lid body 5 is provided on the return filter 3 and the tank 2 to cover the opening 31b. Note that the lid body 5 may be provided only on the return filter 3.

Figure 3:
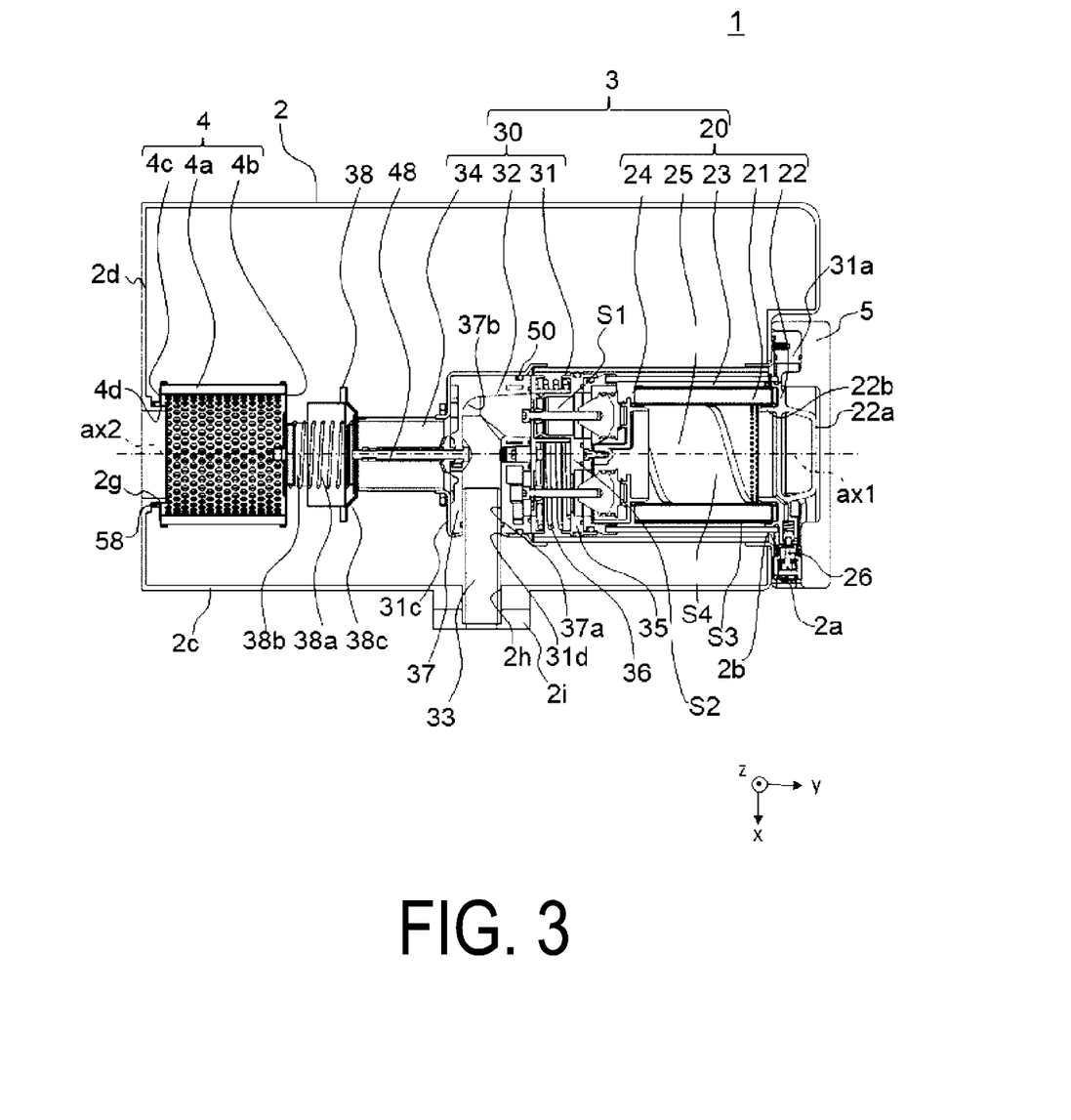
FIG. 3 is a cross-sectional view illustrating an outline of the tank device 1.

FIG. 3 is a cross-sectional view illustrating an outline of the tank device 1. FIG. 3 is a drawing of the tank device 1 cut along a surface passing through center axes ax1 and ax2 of the return filter 3 and the strainer 4 and running along an x-y plane. In FIG. 3, hatching indicating a cross section is omitted.

The return filter 3 is provided inside the tank 2 by fixing the flange portion 31a to the side surface 2a. The strainer 4 is positioned and fixed to the tank 2 by inserting an outflow port 2g formed in the side surface 2d into a through-hole 4d formed at the substantially central part of the lower end support member 4c. A sealing member (for example, an O-ring) 58 is provided between the through-hole 4d and the outflow port 2g to provide sealing so as not to cause a leakage of the hydraulic oil.

In the present embodiment, the center axis ax1 of the return filter 3 substantially matches the center axis ax2 of the strainer 4, but it is sufficient that the return filter 3 overlaps with the strainer 4 when viewed along the center axes ax1 and ax2. As a result, the return filter 3 and the strainer 4 can be provided in a narrow space and the size of the tank 2 can be reduced.

The filter element 20 mainly includes a filtration member 21, a handle portion 22, an outer tube 23, a valve receiving member 24, and an inner tube 25.

The filtration member 21 has a substantially hollow cylindrical shape having the thickness in the radial direction. The filtration member 21 is formed by pleating a sheet-like filter paper using, for example, synthetic resin and paper, and connecting both ends of the pleated filter paper to round in a cylindrical shape.

The outer tube 23 and the inner tube 25 are members having a substantially hollow cylindrical shape and formed using a material with high corrosion resistance (a resin or a metal). Holes through which hydraulic oil passes are formed in the entire inner tube 25. The outer tube 23 is provided on an outer side of the filtration member 21, and the inner tube 25 is provided on an inner side of the filtration member 21. Note that the inner tube 25 is not essential.

The handle portion 22 is provided on one end (the right end, the end on the +y side in FIG. 3) of the filtration member 21, the outer tube 23 and the inner tube 25. The handle portion 22 is fixed to the filtration member 21, the outer tube 23, and the inner tube 25 so as to cover the upper ends of the filtration member 21, the outer tube 23, and the inner tube 25. A gripping portion 22a as a member for a worker to grip the filter element 20 is provided on the handle portion 22. The handle portion 22 has a tubular portion 22b that fits the inner peripheral surface of the inner tube 25 and that has a role as a lid of the filter element 20.

Furthermore, a measurement unit 26, such as a differential pressure sensor and a thermometer, is provided on the handle portion 22. The differential pressure sensor detects a pressure difference (a differential pressure) between an inflow space S3 and an outflow space S4.

The valve receiving member 24 is provided on the other end (the left end, the −y side end in FIG. 3) of the filtration member 21, the outer tube 23, and the inner tube 25. The valve receiving member 24 is formed using a material (a resin or a metal) having a high corrosion resistance. The valve receiving member 24 will be described in detail later.

The housing 30 mainly includes a filter case 31 inside of which the filter element 20 is provided, a head 32 provided inside the filter case 31, an outflow pipe 34 provided on the filter case 31, and a back pressure valve 38.

The filter case 31 is a member having a bottomed substantially tubular shape, and is formed from a metal or a resin. The flange portion 31a and the opening 31b (not illustrated in FIG. 3) are provided at the end on the +y side of the filter case 31. After the filter element 20 is inserted into the filter case 31 from the opening 31b, the opening 31b is covered with the lid body 5.

A bottom surface 31c is provided at an end on the side (on the −y side) opposite to an opening 31b of the filter case 31. Moreover, a hole 31d is formed in a side surface of the filter case 31.

Note that in the present embodiment, the filter case 31 is formed by combining a substantially tubular member and a bottomed substantially tubular member, but the configuration of the filter case 31 is not limited thereto.

The head 32 on which the valve receiving member 24 of the filter element 20 is mounted is provided inside the filter case 31.

The head 32 mainly includes a plate 35, a compression spring 36, and a body portion 37. The plate 35 is provided in the body portion 37 via the compression spring 36.

A sealing member 50 (for example, an O-ring) is provided between the filter case 31 and the body portion 37. The sealing member 50 provides sealing to avoid a liquid to leak outside from between the filter case 31 and the body portion 37. The head 32 will be described in detail later.

A tubular member 33 is a substantially tubular member that communicates between the outside of the tank 2 and the inside of the filter case 31. An inflow port 37a that guides oil before filtration to an inflow space S1 is provided in a side surface of the body portion 37. The inflow port 37a is an opening at one end of a hole 37b provided in the body portion 37. The tubular member 33 is inserted into the hole 31d and the inflow port 37a. Furthermore, a hole 2h is provided in the side surface 2c adjacent to the side surface 2a and the side surface 2d of the tank 2, and the tubular member 33 is inserted into the hole 2h. As a result, the hydraulic oil before the filtration is guided to the inflow space S1 via the tubular member 33.

The outflow pipe 34 has a substantially tubular shape (here, a substantially cylindrical shape), and is provided on the bottom surface 31c. The outflow pipe 34 communicates with an outflow space S2 via the head 32.

The back pressure valve 38 is provided on the distal end (the −y side, the side opposite to the bottom surface 31c side) of the outflow pipe 34. The outflow pipe 34 and the back pressure valve 38 constitute an outflow portion that causes hydraulic oil after filtration that has passed through the filtration member 21 to flow out to the tank 2. The back pressure valve 38 mainly includes an elastic member 38a, a fixing portion 38b on which one end of the elastic member 38a is provided, and a moving member 38c on which the other end of the elastic member 38a is provided. The fixing portion 38b abuts on the strainer 4.

As a pressure inside the filter case 31 rises, the moving member 38c moves against a biasing force of the elastic member 38a, from a closed state in which the moving member 38c abuts on the outflow pipe 34 (the state illustrated in FIG. 3) to an open state in which the moving member 38c does not abut on the outflow pipe 34.

When an operation of an engine of, for example, a work machine is stopped, the hydraulic oil is not contained in the filter case 31. Thus, the back pressure valve 38 is in the closed state. When the engine of the work machine operates and a flow rate of the hydraulic oil increases, the inside of the filter case 31 is filled with the hydraulic oil, and the pressure inside the filter case 31 becomes sufficiently high. Thus, the hydraulic oil pushes down the moving member 38c against the biasing force of the elastic member 38a, and the back pressure valve 38 enters the open state. As a result, the hydraulic oil after filtration flows out from the outflow pipe 34.

Further, a valve 48 is provided on the body portion 37. The outflow pipe 34 is provided so as to cover the valve 48. The valve 48 opens and closes in accordance with a difference between the pressure in the inflow space S1 and the pressure in the external space of the housing 30. The valve 48 is well known, and thus, detailed description of the valve 48 is omitted.

Further, an air vent valve (not illustrated) may be provided on the body portion 37. When air is accumulated inside the body portion 37, the air vent valve opens to discharge the air into the tank 2. In the present embodiment, since the return filter 3 is provided sideways, the air vent valve is provided on the upper side (the +z side) of the side surface of the body portion 37.

Figure 4:
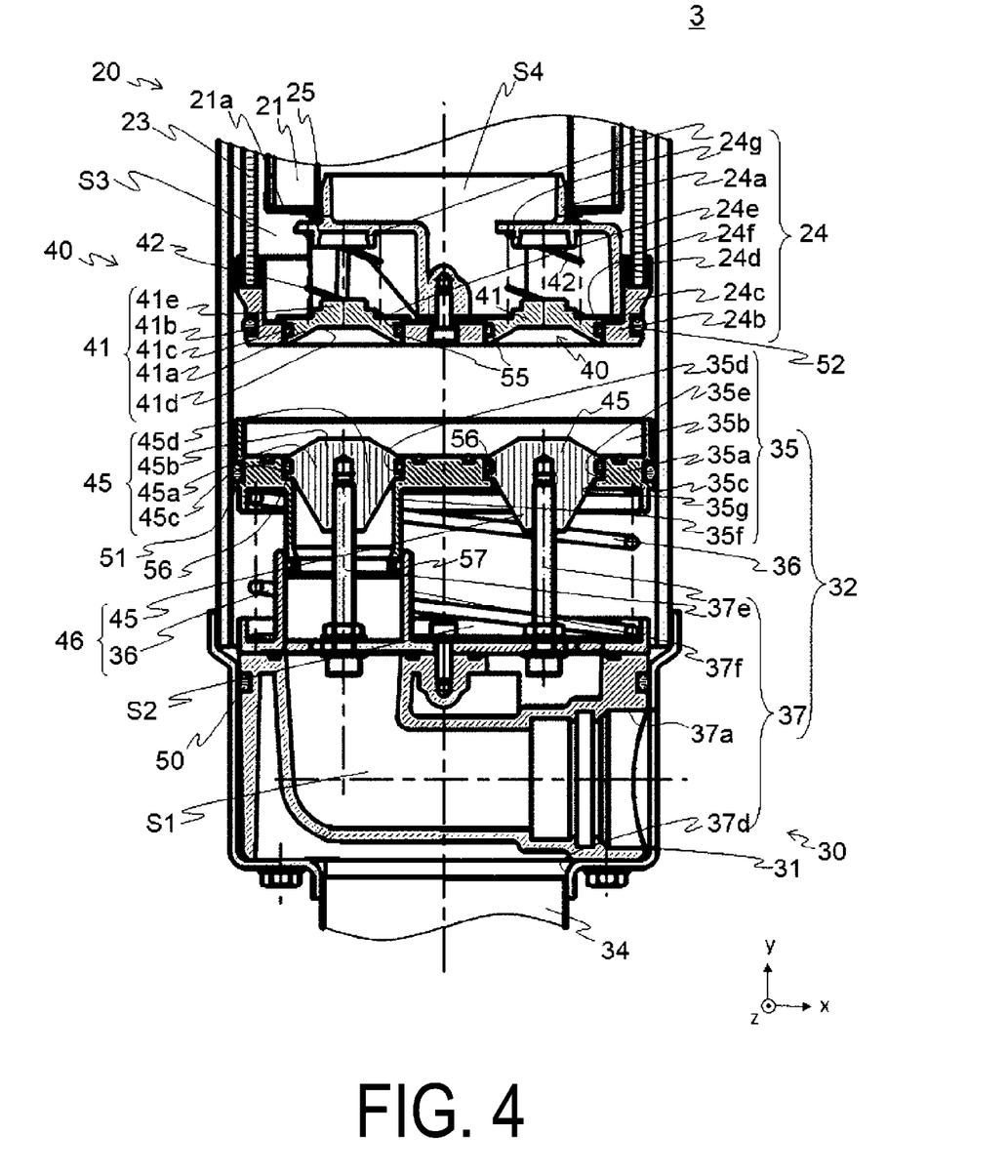
FIG. 4 is a partially enlarged cross-sectional view of the return filter 3 in a state before a filter element 20 is mounted on a head 32.

Next, the valve receiving member 24 and the head 32 will be described. FIG. 4 is a partially enlarged cross-sectional view of the return filter 3 in a state before the filter element 20 is mounted on the head 32. In FIG. 4, hatching indicating a cross section is partially omitted.

The valve receiving member 24 mainly includes an inner tube portion 24a, a plate-like portion 24b, and an outer tube portion 24c. The distal end of the inner tube portion 24a is fitted to an inner peripheral surface of a plate 21a provided at the end portion of the filtration member 21, and the outer tube 23 is fitted to a groove 24d formed in the distal end of the outer tube portion 24c, thereby integrating the filtration member 21, the outer tube 23, and the valve receiving member 24.

The plate-like portion 24b has a substantially disk shape, and substantially tubular holes 24e and 24f are formed. Dirty oil that has not been filtered into the filtration member 21 (the oil before filtration) is caused to flow into the hole 24e as an oil inlet port, and oil filtered by the filtration member 21 (oil after filtration) is caused to flow out from the hole 24f as an oil outlet port. The hole 24e is connected to the inflow space S3, and the hole 24f is connected to the outflow space S4.

The valve receiving member 24 is provided with a valve 40. The valve 40 includes a cover member 41 that closes the hole 24e and the hole 24f by being inserted into the hole 24e and the hole 24f, and a compression spring 42 that biases the cover member 41 with a force.

The cover member 41 includes a substantially disk-shaped inserted portion 41a inserted into the holes 24e and 24f, and a flange portion 41b provided on the surface (the surface on the +z side) of the inserted portion 41a. The flange portion 41b has a plate shape and an outer diameter greater than inner diameters of the holes 24e and 24f.

The inserted portion 41a has a substantially cylindrical shape and an outer diameter substantially the same as the inner diameters of the holes 24e and 24f. A groove 41c is formed in the outer periphery of the inserted portion 41a, and a sealing member (for example, an O-ring) 55 is provided in the groove 41c. A back surface (a −z side surface) 41d of the inserted portion 41a has a depressed shape of a substantially truncated cone as a whole.

The compression spring 42 is, for example, a coil spring, and has one end provided on a back side of a bottom surface (a projection portion 24g) of the inner tube portion 24a, and the other end provided on the cover member 41 (a projection portion 41e formed on the surface of the flange portion 41b). Thus, the compression spring 42 biases the cover member 41 with a force in the −y direction.

When the compression spring 42 biases the force in the −y direction, the inserted portion 41a is inserted into the hole 24e or the hole 24f, the cover member 41 is disposed at a position where the flange portion 41b abuts on the plate-like portion 24b, and thus the cover member 41 closes the hole 24e or the hole 24f. This state is the state in which the valve 40 is closed.

The body portion 37 partitions the inside of the filter case 31 into the inflow space S1 that causes the oil before filtration to flow into the filter element 20 and the outflow space S2 that causes the oil after filtration flowed out of the filter element 20 to flow to the outside of the tank device 1.

The compression spring 36 has one end on the back surface of the plate 35 and the other end on the surface of the body portion 37 to bias the upward (the +y-direction) force to the plate 35. Thus, the plate 35 is disposed at a position away from the body portion 37 by a natural length of the compression spring 36.

The plate 35 has a substantially disk shape as a whole and includes a substantially plate-like body portion 35a and a cylindrical portion 35b formed to protrude upward from the body portion 35a. A groove 35c is formed in the outer peripheral surface of the body portion 35a, and a sealing member 51 (for example, an O-ring) is provided in the groove 35c. The sealing member 51 provides sealing to avoid a liquid to leak from between the filter case 31 and the body portion 35a.

Holes 35d and 35e that penetrate the body portion 35a in a plate pressure direction are formed in the plate 35. The hole 35d is an oil inlet port through which the oil before filtration passes, and a hole 35e is an oil outlet port through which the oil after filtration passes. The diameter of the hole 35d is substantially the same as the diameter of the hole 24e, and the diameter of the hole 35e is substantially the same as the diameter of the hole 24f.

A cylindrical portion 35f protruding in the −y direction is formed in the body portion 35a. The hollow portion of the cylindrical portion 35f communicates with the hole 35d. The distal end of the cylindrical portion 35f is slidably provided inside a cylindrical portion 37f formed on the upper surface of the body portion 37. The internal space of the cylindrical portion 37f and the cylindrical portion 35f is the inflow space S1, and the external space of the cylindrical portion 37f and the cylindrical portion 35f is the outflow space S2. The cylindrical portion 35f is narrower than the hole 35d.

A sealing member 57 is provided on the outer periphery of the cylindrical portion 35f and provides sealing to avoid a liquid to leak from between the cylindrical portion 37f and the cylindrical portion 35f.

In addition, a hole 35g narrower than the hole 35e is formed in the body portion 35a as a lower hole of the hole 35e. The diameter of the hole 35g is narrower than the diameter of the cylindrical portion 35f.

Cover members 45 are provided on the respective holes 35d and 35e. The cover member 45 is fixed to a distal end of a shaft 37e provided on the body portion 37.

The cover member 45 includes a thick plate-like inserted portion 45a inserted into the hole 35d or 35e. The inserted portion 45a has a substantially cylindrical shape and an outer diameter substantially the same as inner diameters of the holes 35d and 35e. A groove 45c is formed in the outer periphery of the inserted portion 45a, and a sealing member (for example, an O-ring) 56 is provided in the groove 45c.

A protrusion portion 45d narrower than the inserted portion 45a is formed on the back surface of the inserted portion 45a. The shaft 37e is provided on the protrusion portion 45d. The protrusion portion 45d is narrower than the cylindrical portion 35f and the hole 35g, and the inserted portion 45a is thicker than the cylindrical portion 35f and the hole 35g.

The cover member 45 and the compression spring 36 constitute a valve 46. Pushing up the plate 35 by the compression spring 36 disposes the plate 35 at a position where the respective inserted portions 45a close the holes 35d and 35e (a position where the protrusion portion 45d is inserted into the cylindrical portion 35f or the hole 35g). This state is the state in which the valve 46 is closed. With the valve 46 closed, the sealing member 56 provides sealing to avoid a liquid to leak from between the inserted portion 45a and the hole 35d or 35e.

A front surface 45b of the inserted portion 45a has a protruding shape of a substantially truncated cone as a whole. The front surface 45b and a back surface 41d have complementary shapes.

Next, assembly, replacement of components, and actions of the tank device 1 thus formed will be described.

Before using the tank device 1, the filter element 20 is set in the housing 30. Specifically, as illustrated in FIG. 1 and FIG. 2, the worker inserts the filter element 20 from the opening 31b. When the filter element 20 is inserted into the filter case 31 up to the deepest part as is, as illustrated in FIG. 5, the back surface 41d of the cover member 41 abuts on the front surface 45b of the cover member 45, and the outer periphery (a sealing member 52) of the plate-like portion 24b is fitted to the cylindrical portion 35b.

Figure 5:
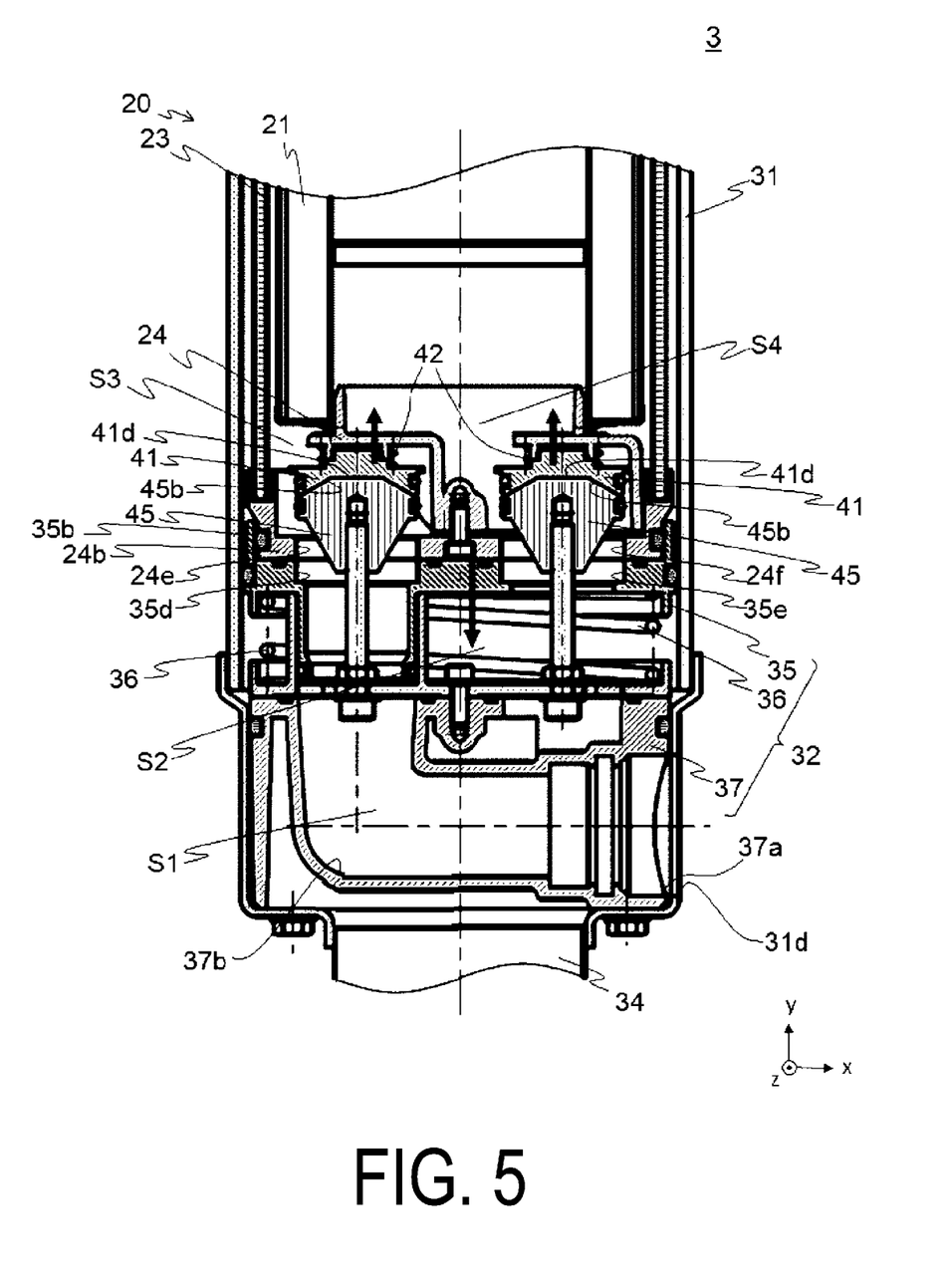
FIG. 5 is a partially enlarged cross-sectional view of the return filter 3 with the filter element 20 mounted on the head 32.

FIG. 5 is a partially enlarged cross-sectional view of the return filter 3 with the filter element 20 mounted on the head 32. In FIG. 5, hatching indicating a cross section is partially omitted.

As a result of the worker pushing the filter element 20, the valve receiving member 24 presses the plate 35 against the biasing force of the compression spring 36 while the back surface 41d of the cover member 41 abuts on the front surface 45b of the cover member 45. As a result, the compression spring 36 is compressed and the valve receiving member 24 and the plate 35 are pushed down (moving in the −y direction, see the thick arrow in FIG. 5).

As a result, against the biasing force of the compression spring 42, the cover member 41 is pressed and pushed up by the cover member 45 (moving in the +y-direction, see the thick arrows in FIG. 5).

Since the back surface 41d of the cover member 41 and the front surface 45b of the cover member 45 have the complementary shapes, the entire back surface 41d abuts on the entire front surface 45b. Accordingly, the cover member 41 is reliably pressed up against the biasing force of the compression spring 42.

When the filter element 20 is mounted on the head 32, the plate-like portion 24b of the valve receiving member 24 fits the cylindrical portion 35b of the plate 35, and therefore the hole 35d communicates with the hole 24e and the hole 24f communicates with the hole 35e. Then, by pressing up the cover member 41, the hole 24e and the hole 35d are opened, and the inflow space S1 communicates with the inflow space S3. In addition, the hole 24f and the hole 35e are opened, and the outflow space S2 communicates with the outflow space S4.

Setting the filter element 20 in the housing 30 and covering the opening 31b with the lid body 5 allow the use of the tank device 1 (see FIG. 3).

As illustrated in FIG. 5, the oil before filtration flowing into from the inflow port 37a passes through the inflow space S1 and flows into the inflow space S3 of the filter element 20. The oil before filtration guided to the inflow space S3 is filtered by passing through the filtration member 21 from outside to inside and is guided to the outflow space S4.

The oil after filtration is discharged from the filter element 20 and guided to the outflow space S2. The oil after filtration guided to the outflow space S2 passes through the outflow pipe 34 and is discharged to the outside of the tank device 1.

Since the back surface 41d of the cover member 41 and the front surface 45b of the cover member 45 have the complementary shapes, the entire back surface 41d abuts on the entire front surface 45b. Therefore, even when the tank device 1 is used, the oil before filtration or the oil after filtration (hereinafter referred to as working oil) does not attach to the back surface 41d.

Figure 6:
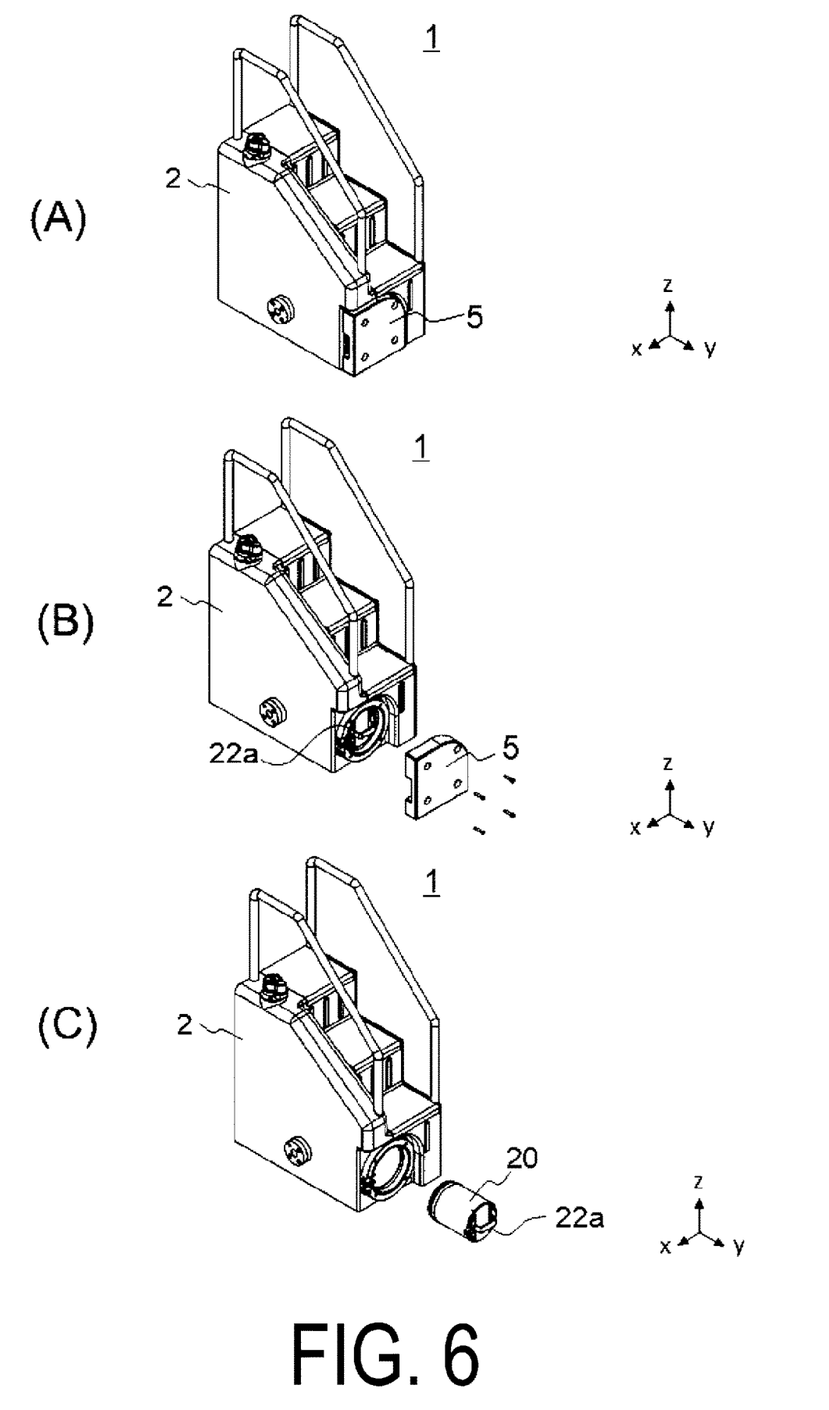
FIG. 6 is a diagram schematically illustrating a state in which the filter element 20 is replaced.

After use for a predetermined period of time, the filter element 20 that has been already used is removed from the housing 30 and replaced by the new filter element 20. FIG. 6 is a diagram schematically illustrating a state in which the filter element 20 is replaced.

The worker removes the lid body 5 as illustrated in FIG. 6(B) from the tank device 1 before the replacement work as illustrated in FIG. 6(A), the worker grips the gripping portion 22a, and pulls the filter element 20 in the +y direction as illustrated in FIG. 6(C). As a result, as illustrated in FIG. 4, the compression spring 36 returns to its original length, the plate 35 and the valve receiving member 24 are pushed up, the abutment between the back surface 41d of the cover member 41 and the front surface 45b of the cover member 45 is released, the fitting between the plate-like portion 24b and the cylindrical portion 35b is released, and the filter element 20 is separated from the housing 30.

When the plate 35 is pushed up, as illustrated in FIG. 4, the cover members 45 close the holes 35d and 35e (the valve 46 is closed). Since the valve 46 is closed, the hydraulic oil remaining inside the head 32 is confined inside the head 32. In this embodiment, the return filter 3 is installed sideways, but closing the valve 46 during the replacement of the filter element 20 avoids the hydraulic oil to leak from the tank 2.

At the same time, the cover member 41 is pushed down by the compression spring 42. As a result, as illustrated in FIG. 4, the cover members 41 close the hole 24e and the hole 24f (the valve 40 is closed). Since the valve 40 is closed, the hydraulic oil remaining inside the filter element 20 is confined inside the filter element 20 and does not flow out of the filter element 20.

Thus, when the filter element 20 is removed outside of the housing 30, the new filter element 20 is set in the housing 30 in the procedure that has been already described.

Figure 7:
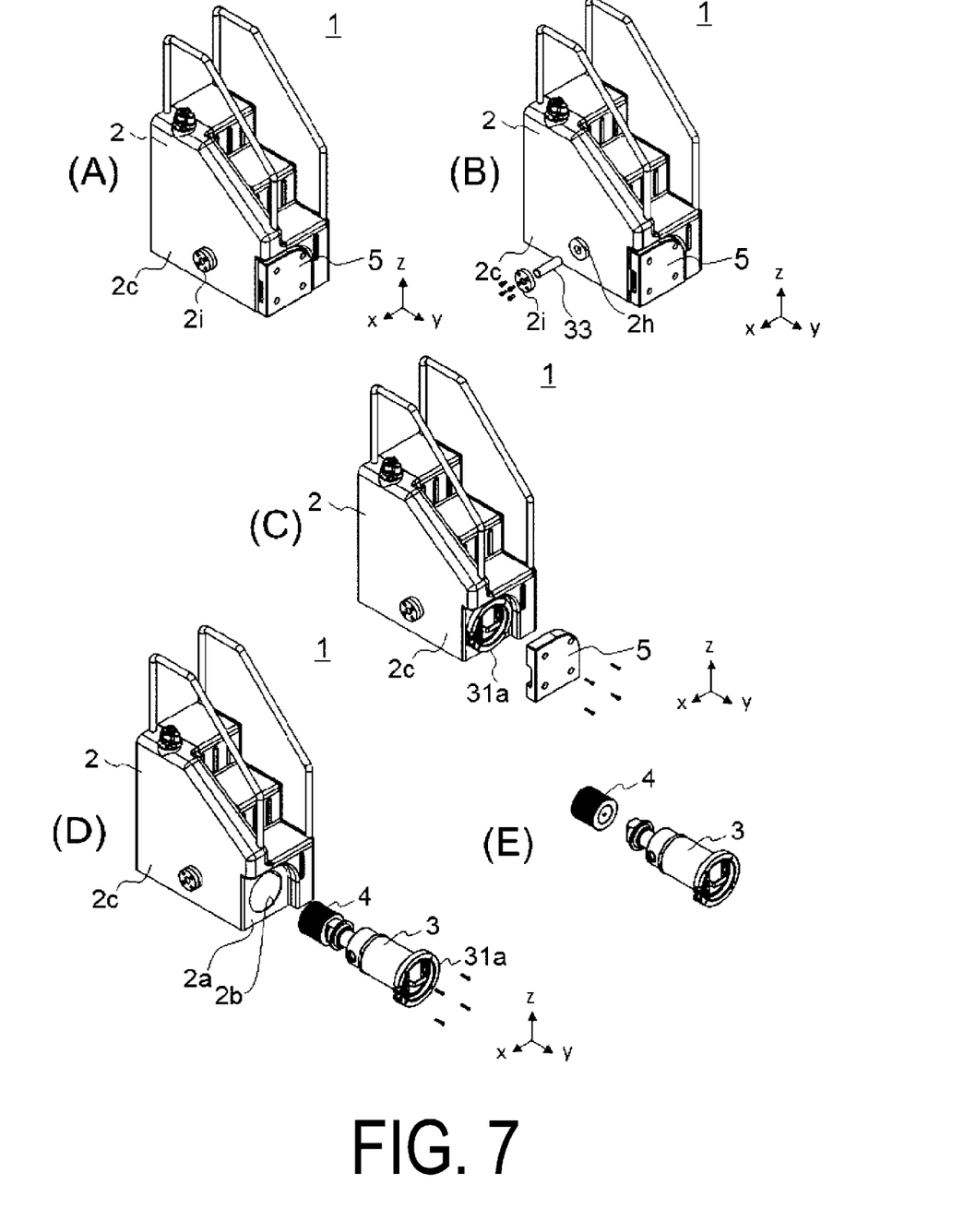
FIG. 7 is a diagram schematically illustrating a state in which the strainer 4 is replaced.

The tank device 1 according to the present embodiment also allows replacement of the strainer 4. FIG. 7 is a diagram schematically illustrating a state of the replacement of the strainer 4.

As illustrated in FIG. 7(B), the worker removes a flange 2i from the side surface 2c of the tank device 1 before the replacement operation illustrated in FIG. 7(A) and pulls the tubular member 33 out of the hole 2h. Thereafter, the worker removes the lid body 5 as illustrated in FIG. 7(C), and pulls the return filter 3 and the strainer 4 in the +y direction as illustrated in FIG. 7(D). Since the return filter 3 and the strainer 4 are integrated, the return filter 3 and the strainer 4 can be drawn out from the tank 2 by removing the flange portion 31a from the tank 2.

As illustrated in FIG. 7(E), the worker disassembles the return filter 3 and the strainer 4. This removes the strainer 4 after being used from the return filter 3.

After that, the worker provides the new strainer 4 on the return filter 3, inserts the return filter 3 and the strainer 4 into the tank 2 from the insertion hole 2b, fixes the flange portion 31a to the side surface 2a, and attaches the lid body 5 to the side surface 2a. In addition, the worker inserts the tubular member 33 from the hole 2h and attaches the flange 2i to the side surface 2c. This sets the new strainer 4 in the tank 2.

According to the present embodiment, the valves 40 and 46 are provided so that hydraulic oil inside the tank 2 or the hydraulic oil inside the filter element 20 does not leak during the replacement of the filter element 20, so the return filter 3 can be installed sideways inside the tank 2. Therefore, to replace the filter element 20, it is not necessary to pull the filter element 20 from above the tank 2. That is, the worker need not perform a work at a high spot, thereby ensuring enhancing safety in the replacement work.

In addition, according to the present embodiment, the return filter 3 and the strainer 4 are integrally provided inside the tank 2, making it possible to downsize the tank 2. Further, the strainer 4 is provided on the side surface 2d via the outflow port 2g, the return filter 3 is provided on the side surface 2a, and the return filter 3 and the strainer 4 are sandwiched between the two parallel side surfaces 2a and 2d. Accordingly, even when the return filter 3 and the strainer 4 are disposed sideways, the return filter 3 and the strainer 4 can be securely fixed to the inside of the tank 2.

Since a construction machine often runs on uneven road surfaces, the tank device 1 also largely vibrates vertically, similar to the construction machine. For example, in a (so-called cantilevered) structure in which the strainer 4 is not provided on the distal end of the return filter 3, and the return filter 3 is attached to only the side surface 2a, the distal end of the return filter 3 vertically moves in conjunction with vibrations of the tank device 1, and strength of the tank device 1 possibly decreases. In contrast, as in the present embodiment, the strength of the tank device 1 can be increased by configuring a (so-called both-ends supported) structure in which the strainer 4 is provided on the distal end of the return filter 3 and the return filter 3 and the strainer 4 are sandwiched between the two opposed side surfaces 2a and 2d of the tank 2.

Furthermore, attaching the side surface of the return filter 3 to the side surface 2c via the tubular member 33 allows preventing the vertical vibration of the return filter 3 and the strainer 4 in conjunction with vibrations of the tank device 1, and allows further increasing the strength of the tank device 1.

Note that in the present embodiment, the return filter 3 and the strainer 4 are provided near the bottom surface 2e, but the return filter 3 and the strainer 4 may be provided at a position away from the bottom surface 2e. However, considering the safety of the replacement work, the return filter 3 and the strainer 4 are preferably provided near the bottom surface 2e.

In addition, in the present embodiment, the return filter 3 and the strainer 4 are integrally provided inside the tank 2, but it is not essential to integrate the return filter 3 and the strainer 4. For example, only the return filter 3 may be disposed sideways inside the tank 2.

However, in a case where the strainer 4 is not provided on the distal end of the return filter 3, to prevent the vertical movement of the distal end of the return filter 3 in conjunction with the vibrations of the tank device 1, the side surface of the return filter 3 is preferably attached to the side surface 2c via the tubular member 33 as in the present embodiment. However, in terms of the strength, the structure in which the strainer 4 is provided on the distal end of the return filter 3 and the return filter 3 and the strainer 4 are sandwiched between the two opposed side surfaces 2a and 2d of the tank 2 is further preferable.

In addition, in the present embodiment, the back pressure valve 38 is provided between the outflow pipe 34 and the strainer 4, but the back pressure valve 38 is not essential. Without the back pressure valve 38, it is only necessary to provide a hole in the side surface of the outflow pipe 34, and provide the distal end of the outflow pipe 34 on the strainer 4.

In addition, in the present embodiment, the back surface 41d of the inserted portion 41a has the depressed shape of the substantially truncated cone and the front surface 45b of the inserted portion 45a has the protruding shape of the substantially truncated cone, but the back surface 41d may have a protruding shape of a substantially truncated cone and the front surface 45b may have a depressed shape of a substantially truncated cone. Furthermore, the back surface 41d and the front surface 45b need to have the complementary shapes, but these shapes are not limited to the protruding shape and the depressed shape of the substantially truncated cones.

In addition, in the present embodiment, the diameters of the inserted portion 41a and the holes 24e, 24f, and the diameters of the inserted portion 45a and the holes 35d and 35e are substantially the same, but the diameters need not be substantially the same, and the diameters of the inserted portion 45a and the holes 35d and 35e only need to be greater than or equal to the diameters of the inserted portion 41a and the holes 24e and 24f.

The embodiments of the invention are described above in detail with reference to the drawings. However, specific configurations are not limited to the embodiments and also include changes in design or the like without departing from the gist of the invention. For example, in the examples described above, detailed description is made to facilitate understanding of the present invention, and the examples are not necessarily limited to examples including all the configurations described above. In addition, the configuration of an embodiment can be replaced partially with the configurations of other embodiments. In addition, addition, deletion, replacement or the like of other configurations can be made on the configurations of the embodiments.

Additionally, in the present invention, "substantially" is a concept not only including the case of being strictly the same, but also including an error and deformation to the extent that a loss of identity does not occur. For example, a term "substantially cylindrical shape" is not strictly limited to a cylindrical shape. Further, for example, when a term "substantially center" is simply expressed, the term includes not only the strict center but also an approximately center.

REFERENCE SIGNS LIST

1: Tank device
2: Tank
2a, 2c, 2d: Side surface
2b: Insertion hole
2e: Bottom surface
2f: Top surface
2g: Outflow port
2h: Hole
2i: Flange
3: Return filter
4: Strainer
4a: Filtration member
4b: Upper end support member
4c: Lower end support member
4d: Through-hole
5: Lid body
20: Filter element
21: Filtration member
21a: Plate
22: Handle portion
22a: Gripping portion
22b: Tubular portion
23: Outer tube
24: Valve receiving member
24a: Inner tube portion
24b: Plate-like portion
24c: Outer tube portion
24d: Groove
24e, 24f: Hole
24g: Projection portion
25: Inner tube
26: Measurement unit
30: Housing
31: Filter case
31a: Flange portion
31b: Opening
31c: Bottom surface
31d: Hole
32: Head
33: Tubular member
33b: Opening
34: Outflow pipe
35: Plate
35a: Body portion
35b: Cylindrical portion
35c: Groove
35d, 35e, 35g: Hole
35f: Cylindrical portion
36: Compression spring
37: Body portion
37a: Inflow port
37b: Hole
37e: Shaft
37f: Cylindrical portion
38: Back pressure valve
38a: Elastic member
38b: Fixing portion
38c: Moving member
40: Valve
41: Cover member
41a: Inserted portion
41b: Flange portion
41c: Groove
41d: Back surface
41e: Projection portion
42: Compression spring
45: Cover member
45a: Inserted portion
45b: Front surface
45c: Groove
45d: Protrusion portion
46: Valve
48: Valve
50, 51, 52, 55, 56, 57, 58: Sealing member

The invention claimed is:

1. A tank device comprising:
a tank inside of which is a cavity;
a return filter provided sideways inside the tank, the return filter including a filter case, a head, and a filter element, the filter case having one end as an opening and having a bottomed tubular shape, the head being provided inside the filter case, the filter element including a filtration member having a tubular shape, a valve receiving member provided on an end face of the filtration member, and a valve provided in the valve receiving member;
a lid body provided on the return filter to cover the opening; and
a strainer disposed sideways inside the tank and disposed on the return filter, wherein
the tank has two parallel side surfaces of a tank first side surface and a tank second side surface;
an insertion hole is formed in the tank first side surface;
the filter case is provided on the tank first side surface and inserted into the tank from the insertion hole;
the filter case has a bottom surface provided with an outflow portion that causes a liquid that has passed through the filtration member to flow out to the tank;
the strainer has one end provided on the outflow portion and the other end provided on the tank second side surface;
the valve receiving member includes a plate-shaped portion having a plate shape, the plate-shaped portion has a first hole and a second hole having tubular shapes, the first hole causes oil to flow into the filtration member, and the second hole causes oil after filtration as oil filtered by the filtration member to flow out;
the valve includes a first valve and a second valve, the first valve includes a first cover member and a first compression spring, the first cover member includes a first inserted portion inserted into the first hole to close the first hole, the first compression spring disposes the first cover member at a position where the first inserted portion closes the first hole, the second valve includes a second cover member and a second compression spring, the second cover member includes a second inserted portion inserted into the second hole to close the second hole, and the second compression spring disposes the second cover member at a position where the second inserted portion closes the second hole;
the head includes a plate, a third cover member, a fourth cover member, and a third compression spring, the plate has a third hole and a fourth hole, the third cover member includes a third inserted portion insertable into the third hole, the fourth cover member includes a fourth inserted portion insertable into the fourth hole, and the third compression spring biases a force in a direction toward the opening on the plate so that the plate is disposed at a position where the third cover member closes the third hole and the fourth cover member closes the fourth hole;

in a first state where the filter element is inserted into the filter case from the opening, a first surface of the first cover member abuts on a third surface of the third cover member, a second surface of the second cover member abuts on a fourth surface of the fourth cover member, and the plate abuts on the valve receiving member;

in a second state where the filter element is pushed into the filter case, the valve receiving member presses the plate against a biasing force of the third compression spring, the third cover member presses the first cover member against a biasing force of the first compression spring, and the fourth cover member presses the second cover member against a biasing force of the second compression spring; and in a third state where the filter element is inserted into the filter case up to a deepest part of the filter case, the first hole communicates with the third hole, the second hole communicates with the fourth hole, and an internal space of the filter element communicates with an internal space of the head.

2. The tank device according to claim 1, wherein:

the return filter includes a tubular member that communicates between an outside of the tank and an inside of the filter case;

the tank has a tank third side surface as a side surface adjacent to the tank first side surface and the tank second side surface; and each of the tank third side surface and the filter case has a hole into which the tubular member is inserted.

3. The tank device according to claim 1, wherein the return filter and the strainer are provided near a bottom surface of the tank.

4. The tank device according to claim 2, wherein the return filter and the strainer are provided near a bottom surface of the tank.

* * * * *